(12) United States Patent
Loper

(10) Patent No.: US 7,482,038 B1
(45) Date of Patent: Jan. 27, 2009

(54) PROCESS FOR PREPARING SIDING

(75) Inventor: Thomas Loper, Wilbraham, MA (US)

(73) Assignee: Nucedar Mills, Inc., Chicopee, MA (US)

( * ) Notice: Subject to any disclaimer, the term of this patent is extended or adjusted under 35 U.S.C. 154(b) by 61 days.

(21) Appl. No.: 11/739,958

(22) Filed: Apr. 25, 2007

Related U.S. Application Data

(60) Provisional application No. 60/745,531, filed on Apr. 25, 2006.

(51) Int. Cl.
*B05D 3/12* (2006.01)

(52) U.S. Cl. .................. 427/290; 427/289; 427/292; 427/293

(58) Field of Classification Search ......... 427/289–293; 52/518
See application file for complete search history.

(56) References Cited

U.S. PATENT DOCUMENTS 7,204,062 B2 * 4/2007 Fairbanks et al. ............. 52/522

2004/0040237 A1 * 3/2004 Van Ootmarsum ......... 52/302.1
2005/0016694 A1 * 1/2005 Jella ........................... 160/236

FOREIGN PATENT DOCUMENTS

WO    WO 92/13704    * 8/1992

* cited by examiner

*Primary Examiner*—Shamim Ahmed
(74) *Attorney, Agent, or Firm*—Doherty, Wallace, Pillsbury & Murphy, P.C.

(57) ABSTRACT

An in-line process for forming pre-finished siding manufactured from cellular poly vinyl chloride comprising embossing, milling, parting, punching, and coating the poly vinyl chloride such that the resulting siding is suited for use in an environment exposed to a wide range of fluctuating temperatures and moisture. The process accommodates the natural expansion and contraction of cellular poly vinyl chloride by producing a novel milled clapboard configuration that, when used as siding, can be installed to create a historically correct clapboard installation.

19 Claims, 7 Drawing Sheets

PROCESS FOR PREPARING SIDING

CROSS REFERENCE TO RELATED APPLICATIONS

This application claims the benefit of U.S. Provisional Application No. 60/745,531 filed on Apr. 25, 2006.

BACKGROUND OF THE INVENTION

1. Field of the Invention

The present invention is generally directed to a process for preparing a siding material. More particularly, the present invention relates to a process for preparing cellular polyvinyl chloride materials for use as siding on buildings to mimic traditional, cedar wood clapboard siding.

2. Background of the Invention

Traditionally, siding, e.g., housing siding, is made from cedar wood, fiber cement, engineered wood, and vinyl. Each of these materials, however, has certain inherent problems when used as siding.

For example, siding made from cedar wood tends to absorb moisture, and to, consequently, warp, decay, and rot. Additionally, insects are attracted to the wood, and, therefore, contribute to the decay. Furthermore, when painted, the wood tends to blister, peel, and crack.

Although it absorbs less water than wood siding materials, fiber cement siding does absorb some moisture. Additionally, painted fiber cement siding suffers some of the same problems as does painted wood siding. To reduce the moisture and paint problems, the cut edges of the fiber cement siding must be carefully treated. Furthermore, fiber cement is unduly heavy, brittle, requires specialized tools and instruments for installation, and debris formed during its installation may create health risks. For these reasons, then, fiber cement siding is difficult to install.

With regards to engineered wood, all engineered wood includes wood flour. Accordingly, similar to the wood siding, wood flour absorbs water, swells, warps, decays, rots, attracts insects and sheds paint.

Vinyl siding is formed into 12 foot clapboards from thin sheets of rigid poly vinyl chloride ("PVC"). The use of vinyl siding improves upon the use of wood, in that vinyl does not warp or rot to the same degree as does wood. However, formed vinyl clapboards are very light and hollow giving them a flimsy look and feel. Additionally, vinyl siding must be overlapped to accommodate expansion and contraction. As a result, a tell-tale sign of vinyl versus wood siding is the overlapping joint that appears every 12 feet on all vinyl siding installations. Also, vinyl siding must be inserted into 'j-channel' installed around windows, doors and at all corners in order to accommodate expansion and contraction of the PVC with changes in temperature. Further, vinyl siding chalks over time; i.e. a white powder rises to the surface; especially on darker colors, thereby diminishing the appearance of the siding.

An improved product for use as siding is cellular PVC. Similar to rigid vinyl siding manufactured from PVC, cellular PVC siding expands and contracts about ¼ inch per 14 foot clapboard with changes in temperature of about 50 degrees Fahrenheit. The prior art has attempted to restrict such expansion and contraction by a variety of techniques, e.g., by applying the cellular PVC siding with heavier than normal nailing (as is the common practice for installing cellular PVC trimboard). This, however, has not been effective. Rather, what is needed is a process for forming cellular PVC siding, wherein the process itself accommodates the fact that cellular PVC siding expands and contracts when exposed to certain temperatures.

BRIEF SUMMARY OF THE INVENTION

The above-discussed drawbacks and deficiencies of the prior art are greatly reduced or eliminated by a novel in-line process for preparing a novel configured cellular PVC clapboard for use as siding, wherein the process utilizes novel material removal, product handling, and finishing techniques. The novel process accommodates the natural tendency of cellular PVC siding to expand and contract when exposed to certain temperatures to form a novel milled clapboard configuration that, when used as siding, can be installed to create a historically correct clapboard installation, i.e., to create identical dimensions to cedar clapboard and the appearance of "butted" joints.

The inventive process comprises a series of specially designed milling cutters, saws and punching apparatus with supporting precision product guiding, registration and transport. The process further comprises removal of material via specially designed material removal tools having cutting edges and coatings which have been specifically developed for the high speed machining, sawing and punching of cellular PVC. The inventive process utilizes novel techniques for the mitigation of electrostatic buildup that is inherent in cellular PVC processing, handling, swarf removal and collection. Finally, the inventive process incorporates an in-line, high speed application and accelerated curing of a uniquely formulated, two-part polyurethane finish.

Accordingly, the invention relates to a novel process for converting large cellular PVC sheets for use as pre-finished siding. These large sheets are readily available from many sources and therefore can be obtained at low cost. The subject process utilizes this material in a very efficient way to produce pre-finished cellular PVC siding, with its many inherent advantages, at a cost comparable to conventional primed and field coated wood clapboard siding.

BRIEF DESCRIPTION OF THE DRAWINGS

FIG. 2b is a schematic depicting an exemplary profiling operation comprising milling of the faces and qualifying the thickness of the cellular PVC board depicted in FIG. 2a;

FIG. 2c is a schematic depicting an exemplary profiling operation comprising milling of the upper assemblies and saw grooves on the cellular PVC board depicted in FIG. 2a;

DETAILED DESCRIPTION OF THE INVENTION

Disclosed herein is a novel, in-line, method for preparing cellular PVC materials for use in siding. An exemplary method for preparing the cellular PVC materials for such use comprises an optional step of embossing both the front and back surfaces of cellular PVC sheets and cutting them into more usable sized boards. The cellular PVC boards are milled to specification using a novel apparatus, the process of which will be explained in greater detail below. Each milled board is parted into two clapboards utilizing a specially modified bandsaw. Additionally, slots are punched through the clapboards for installation purposes. Furthermore, the clapboards are cleaned, coated and cured. Through the process, cellular PVC siding is prepared which exhibits reduced expansion and contraction properties as compared to conventionally prepared cellular PVC siding. The process is more specifically discussed with reference to the Figures.

Figure 1:
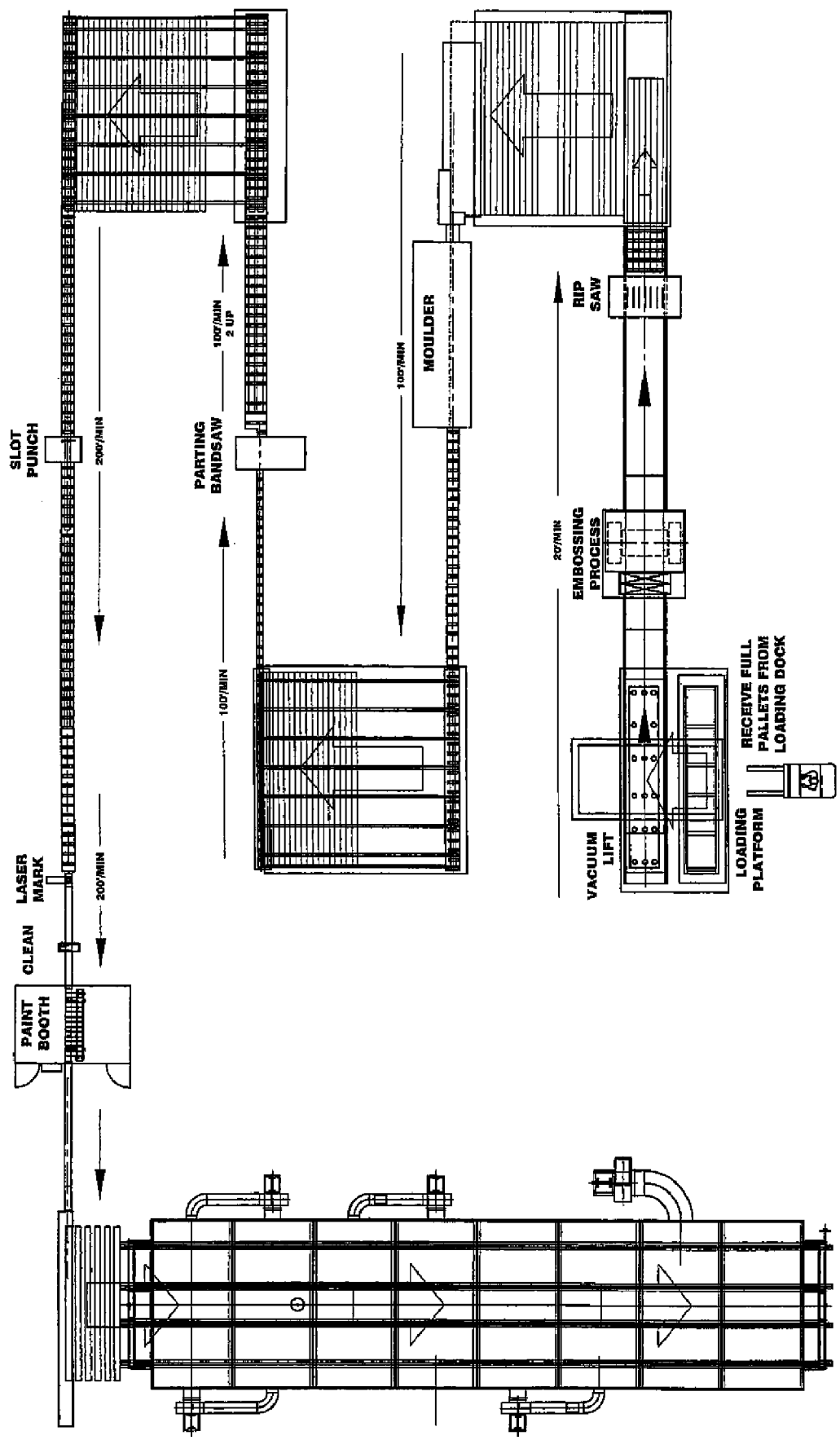
FIG. 1 is a schematic depicting an exemplary process.

Referring to FIG. 1, an exemplary process begins with the receipt of full pallets, each pallet comprising a stack of cellular PVC sheets. The pallets are placed onto a platform. Single cellular PVC sheets are then sequentially vacuumed picked by an automated gantry pick and place destacker from the top of the stack and placed onto a powered conveyor. The powered conveyor feeds the cellular PVC sheets end to end through an optional embossing process.

The embossing process includes an infra-red heater array that warms and, therefore, softens the surfaces of the cellular PVC sheets for embossing by patterned pinch rollers. In an exemplary embodiment, these patterned pinch rollers apply approximately 6,000 pounds of force to apply a wood grain to the top and bottom surfaces of each cellular PVC sheet, at a rate of approximately 20 feet per minute ("ft/min").

The embossed, or the non-embossed (depending on whether embossing was done), cellular PVC sheets are then conveyed end to end, precisely registered against a datum edge and fed into a gang rip saw that will, depending upon the size of the desired finished clapboard, simultaneously cut the cellular PVC sheet into multiple (e.g., 4 or 6) parallel cellular PVC boards at a rate of about 20 ft/min. The gang rip saw cuts the sheet at a width which is calculated to minimize waste. Accordingly, in an exemplary embodiment, the width of the individual boards is preferably generated by a waste minimizing, two-up configuration, i.e. each board will yield two back-to-back clapboards, wherein the creation of back-to-back ½ inch thick clapboards is especially preferred.

The cut cellular PVC boards are then conveyed by a cross-feed conveyor into the infeed section of a moulder, i.e., profiling machinery. This infeed section precisely registers the cellular PVC boards against a datum edge and sequentially feeds them, end to end, in continuous strip fashion through the moulder.

Referring to FIGS. 1 and 2, the moulder, at a speed of about 100 ft/min, precisely feeds the cellular PVC boards through a series of specially designed milling operations to achieve the desired profile from the relatively irregular boards. More specifically, each of the individual milling operations incorporates specially contoured tools specifically designed for cellular PVC, thereby providing novel qualifying cuts on all surfaces of each board, as necessary, to standardize the milled dimensions of each finished board to yield a two-up back-to-back clapboard configuration.

Additionally, each milling head comprises uniquely constructed swarf removal ductwork incorporating static dissipation techniques. The static dissipation techniques include electrically connecting any component contacting the cellular PVC board in the milling operations to earth ground through the use of a high amperage copper wire network.

Figure 2A:
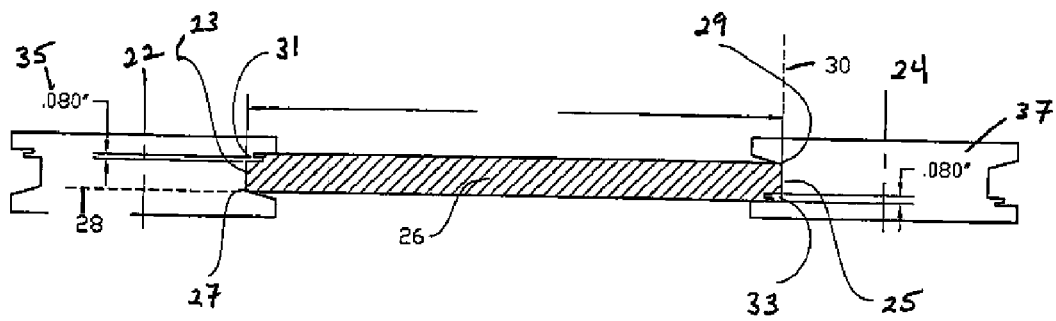
FIG. 2a is a schematic depicting an exemplary profiling operation comprising milling of the ends, radii, and lower assembly grooves on a cellular PVC board.

Referring to FIG. 2a, in an exemplary embodiment, milling cutters 22 and 24, each operating at about 8,000 revolutions per minute ("rpm"), flank the ends 23 and 25 of a cellular PVC board 26, which is registered against a horizontal datum edge 28 and a vertical datum edge 30. Milling cutters 22 and 24 respectively mill ends 23 and 25, the radii 27 and 29, and the lower assembly grooves 31 and 33 of cellular PVC board 26. In an exemplary embodiment, each of lower assembly grooves 31 and 33 respectively comprises a throat opening dimension 35 and 37 of about 0.080 inch, which has proven to be critical to ease of assembly in the field. Additionally, milling cutters 22 and 24 also qualify the width of cellular PVC board 26.

Figure 2B:
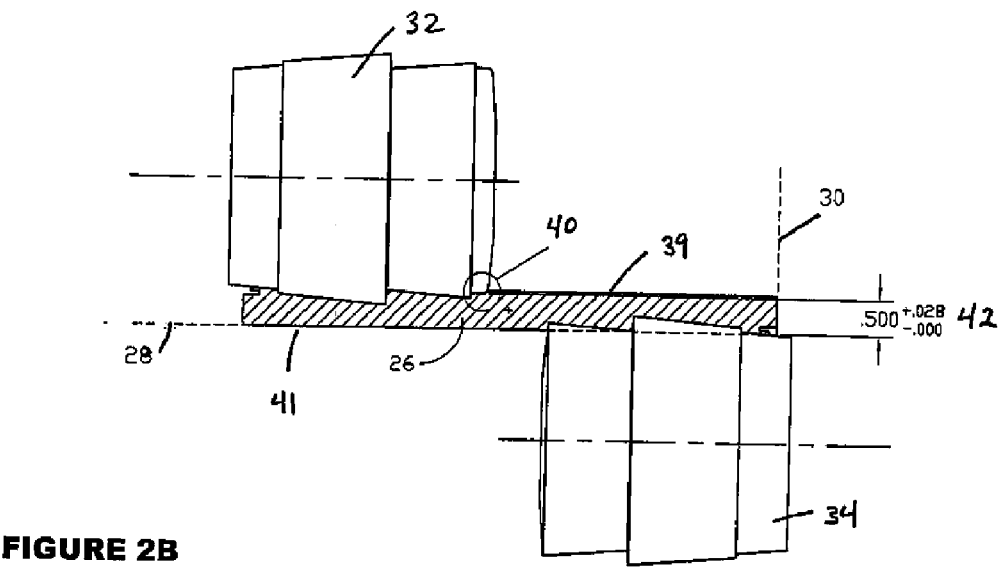

Once milling cutters 22 and 24 have completed their tasks, cellular PVC board 26 continues through the milling process while remaining registered against horizontal datum edge 28 and vertical datum edge 30. At this point, milling cutters 32 and 34 are employed. Referring to FIG. 2b, in an exemplary embodiment, milling cutters 32 and 34 respectively mill faces 39 and 41 of cellular PVC board 26. Such milling preferably occurs at a speed of about 8,000 rpm to achieve the desired profile. The two-up configuration requires this profile to have extremely precise angles to maximize cross-sections of certain areas while minimizing waste. Additionally, in an exemplary embodiment, milling cutter 32 qualifies a thickness 40 of cellular PVC board 26 in the vicinity of what will be an upper assembly groove 43 to about 0.500 inch, plus 0.028 inch, minus 0.000 inch.

Figure 2C:
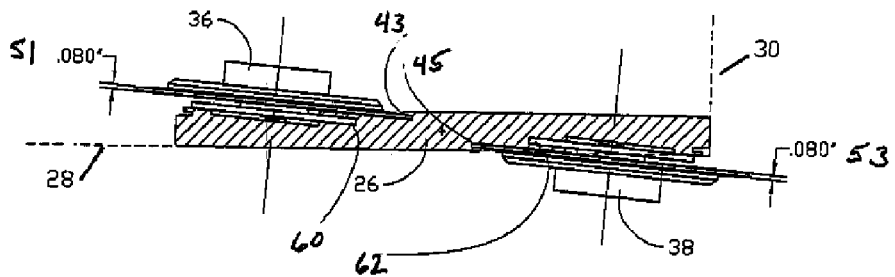

Referring to FIG. 2c, in an exemplary embodiment, after milled by milling cutters 32 and 34, cellular PVC board 26 remains registered against horizontal datum edge 28 and vertical datum edge 30, and upper assembly grooves 43 and 45 and saw grooves 60 and 62 are respectively milled by specially designed milling heads incorporating two-tiered multiple milling cutter arrays 36 and 38 at a speed of about 12,000 rpm. In a particularly preferred embodiment, each of upper assembly grooves 43 and 45 respectively comprise a throat opening dimension 51 and 53 of about 0.080 inch, as this dimension is critical to ease of assembly in the field. Additionally, it is important that the location of saw grooves 60 and 62 be precise to help locate the critical parting cut that separates the two-up clapboards.

Again referring to FIG. 1, once milled, the now profiled cellular PVC boards exit the moulder, and are fed by a cross-feed conveyor into a gravity chute that reorients the profiled cellular PVC boards from traveling flat to traveling on edge.

Figure 3:
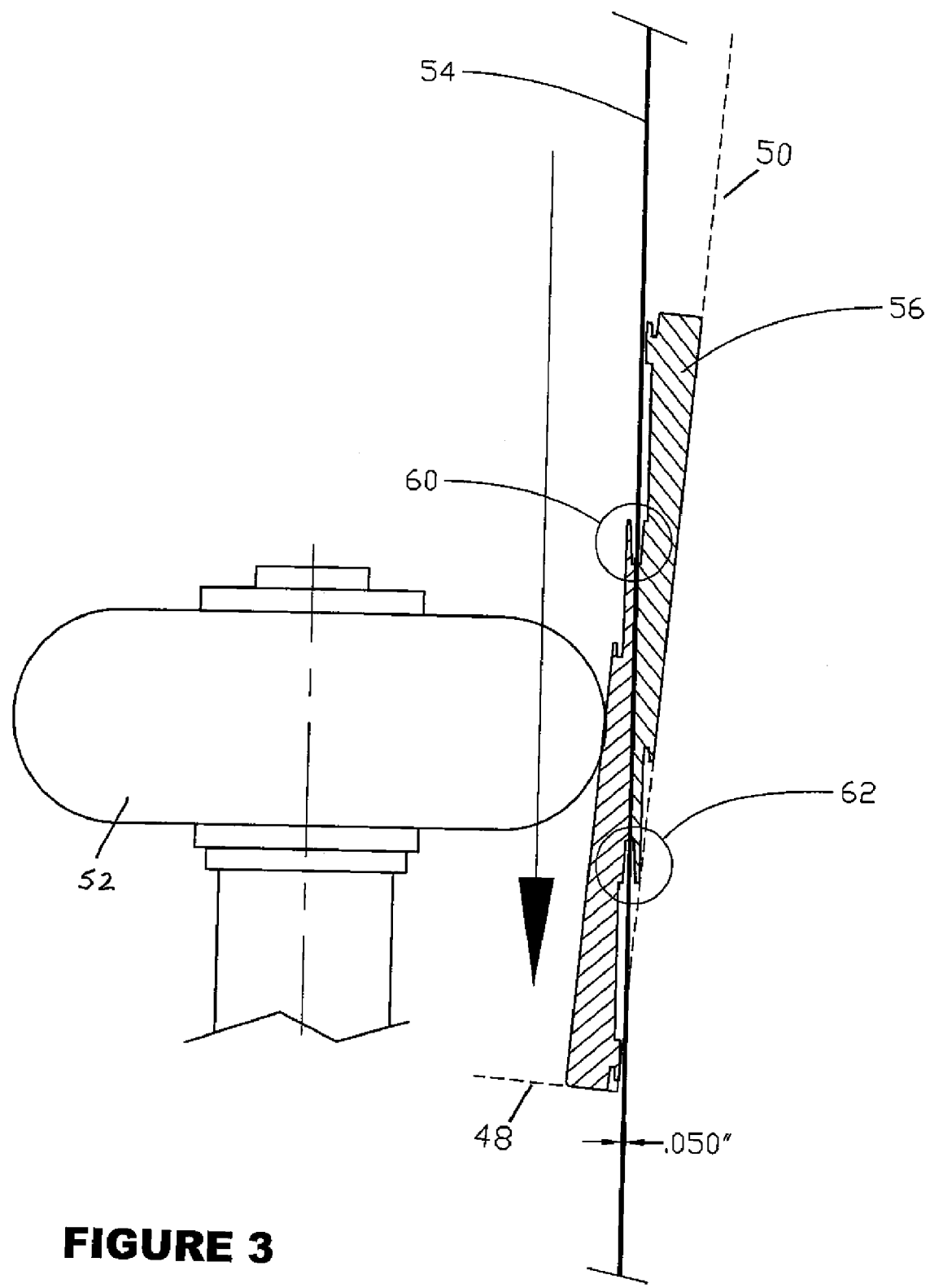
FIG. 3 is a schematic depicting an elevational cross-sectional view of an exemplary parting operation.
Figure 4A:
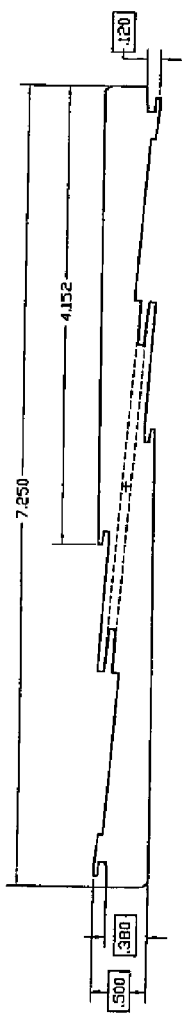
FIG. 4a is a schematic depicting a full scale exemplary 4 inch cellular PVC board having a two-up configuration and formed by the inventive process, wherein measurements are in inches.
Figure 4B:
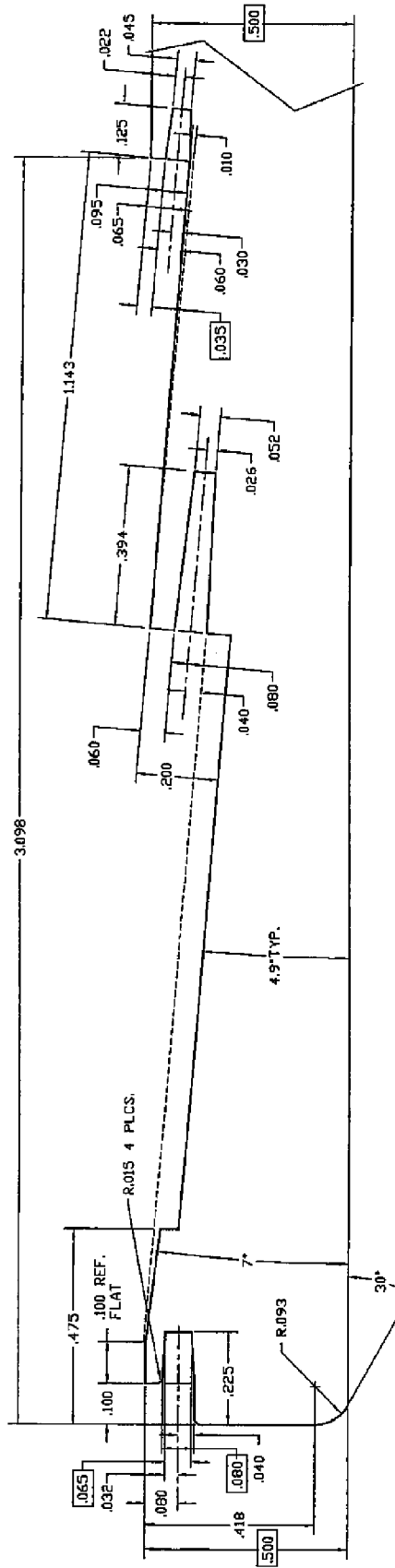
FIG. 4b is a schematic depicting a 4× scaled version of the clapboard depicted in FIG. 4a, wherein measurements are in inches.
Figure 5B:
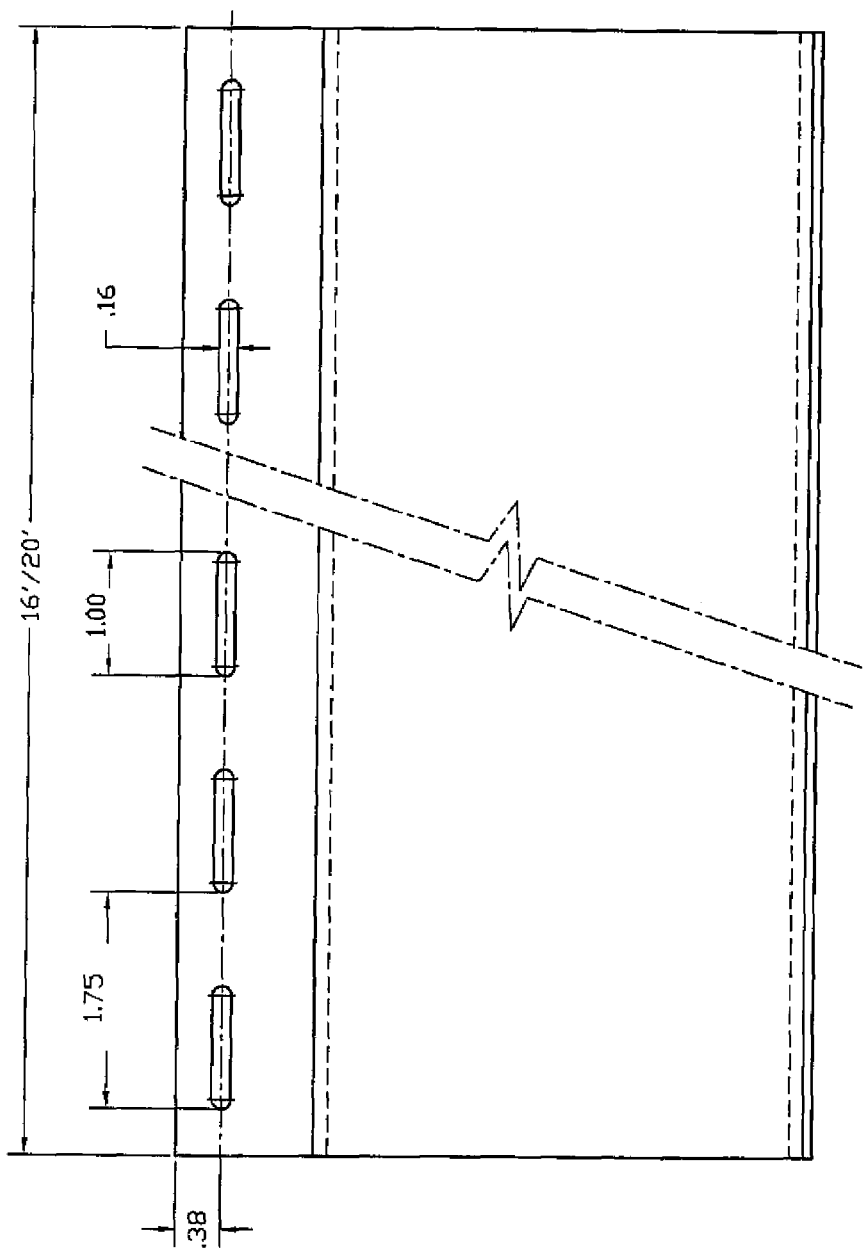
FIG. 5b is a schematic depicting a view of a face of the clapboard depicted in FIG. 5a, wherein measurements are in inches.
Figure 5A:
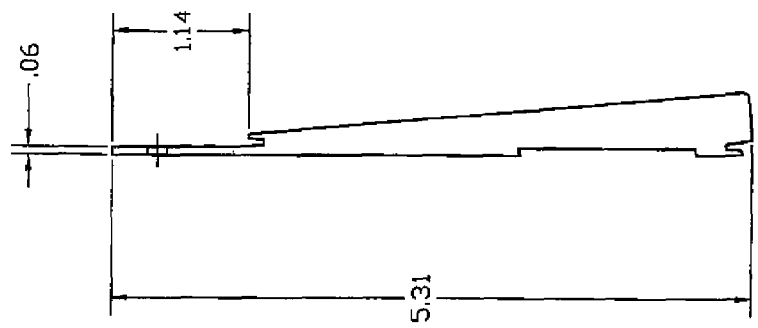
FIG. 5a is a schematic depicting a side view of an exemplary 4 inch cellular PVC clapboard formed by the inventive process, wherein measurements are in inches.
Figure 6A:
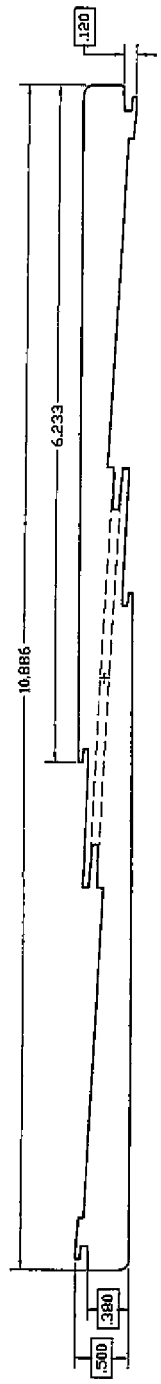
FIG. 6a is a schematic depicting a full scale exemplary 6 inch cellular PVC board having a two-up configuration and formed by the inventive process, wherein measurements are in inches.
Figure 6B:
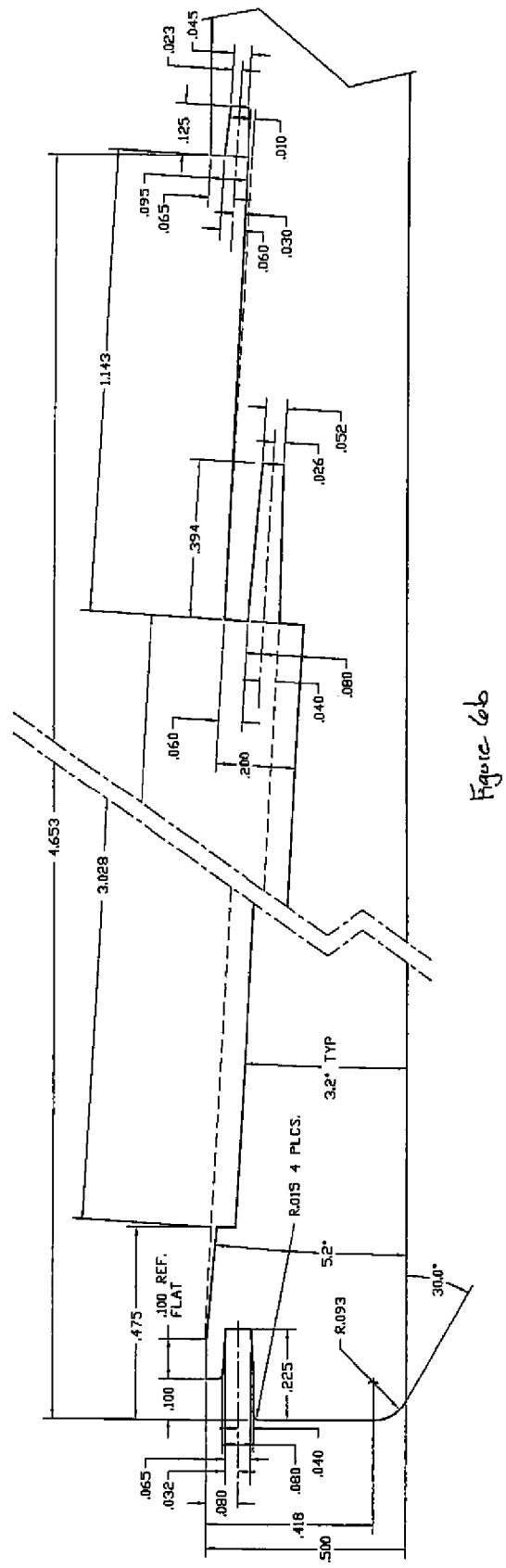
FIG. 6b is a schematic depicting a 4× scaled version of the clapboard depicted in FIG. 6a, wherein measurements are in inches.
Figure 7B:
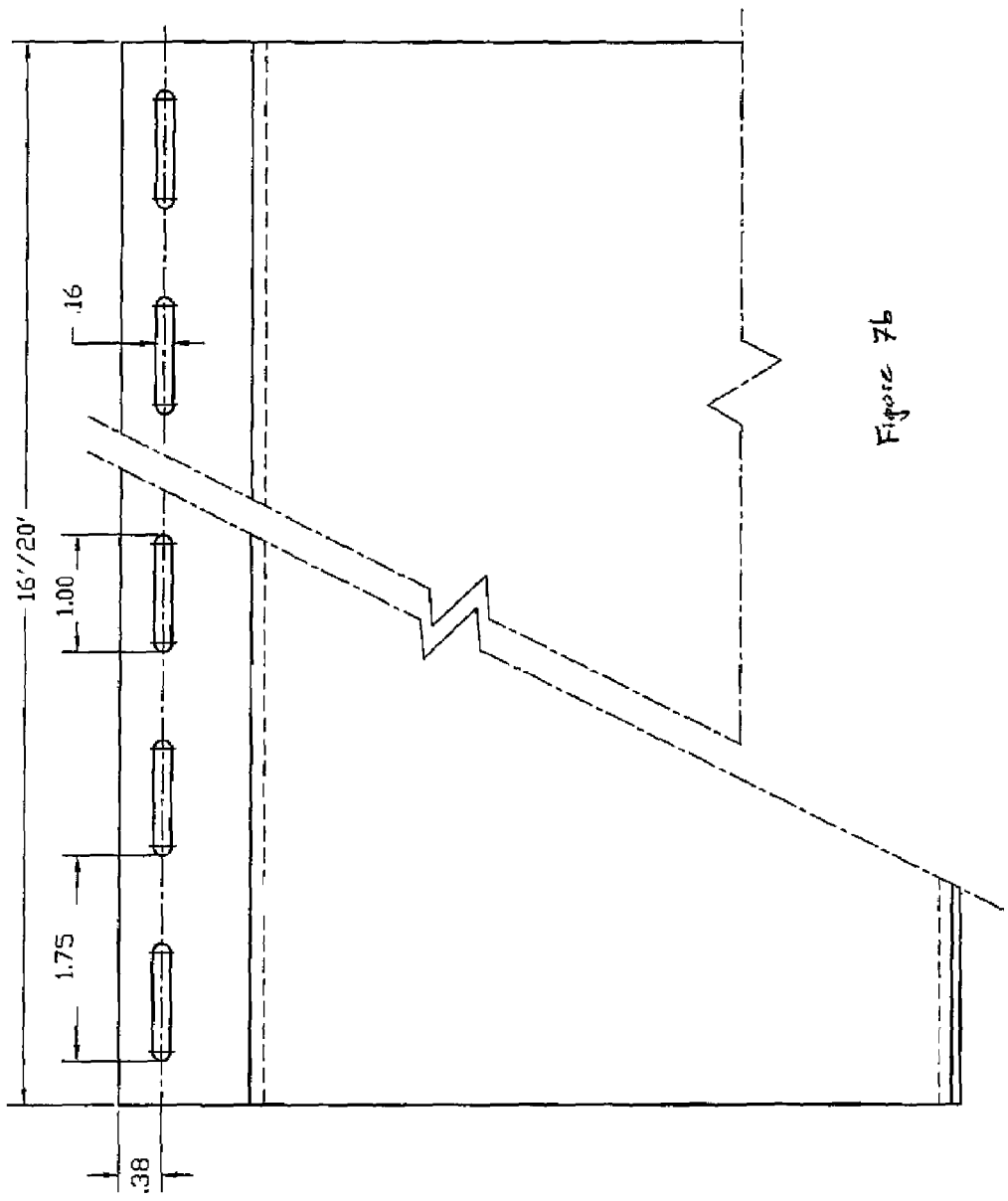
FIG. 7b is a schematic depicting a view of a face of the clapboard depicted in FIG. 7a, wherein measurements are in inches.
Figure 7A:
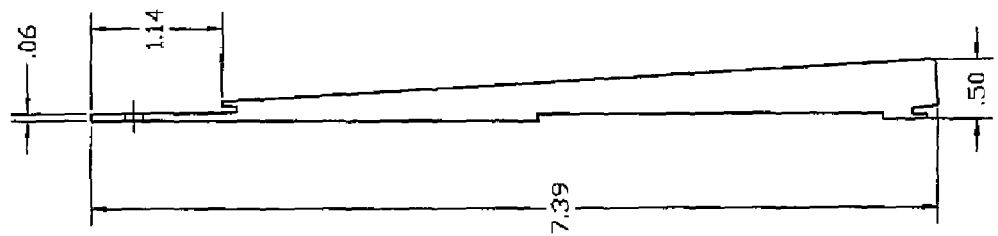
FIG. 7a is a schematic depicting a side view of an exemplary 6 inch cellular PVC clapboard formed by the inventive process, wherein measurements are in inches.

Referring to FIGS. 1 and 3, the profiled cellular PVC boards, now traveling on edge, are carefully and precisely guided end to end into a band type sawing machine at a rate of about 100 ft/min. Each cellular PVC board registers against a horizontal datum surface 48 and a vertical datum surface 50.

The cellular PVC board is driven through the parting process by a special drive wheel 52, preferably a urethane drive wheel. A precisely guided parting band saw blade 54 traveling at a feed speed of about 60 meters per second parts board 56 into two, identically profiled cellular PVC clapboards.

Additionally, in an exemplary embodiment, specially developed band saw blade 54 leaves a kerf of not more than about 0.050 inch thick. The saw blade precisely-follows the two pre-milled saw grooves 60 and 62 in order to achieve the proper parting cut location. The location, angle and kerf width of this parting cut is generated by the finished clapboard profile, including assembly grooves and nailing flanges common to all exposure sizes of clapboard as well as the common thickness of ½ inch. The location and angle of this parting cut is crucial to the functioning of the siding. If the cut is slightly out of position it will destroy the assembly groove profiles thereby rendering the clapboard impossible to assemble in the field.

Again referring to FIG. 1, the parted cellular PVC clapboards exit the sawing machine and are reoriented to a lying flat position with the cosmetic surface up and similarly aligned. The cellular PVC clapboards are transferred and then fed end to end at a rate of about 200 ft/min into a uniquely designed, continuous motion, slotting machine where an uninterrupted row of nailing slots are punched into the cellular PVC clapboards. These slots are utilized, during installation, to fasten the cellular PVC clapboards to the structure being sided.

The cellular PVC clapboards exit the slotting machine and are then transferred and fed end to end through a laser marking station where a manufacturing logo and date code can be laser etched onto the backside of the cellular PVC clapboard. After this step, the cellular PVC clapboards travel into a cleaning and de-ionizing module at a rate of about 200 ft/min. This specially designed module subjects the cellular PVC clapboard to high intensity de-ionizing air jets which minimize static charge built up through the milling and handling process. The cellular PVC clapboard then continues through a brushing and vacuuming section to thoroughly clean and prepare the cellular PVC clapboard for painting.

The cellular PVC clapboard then continues traveling at a speed of about 200 ft/min through a paint application booth where specially configured and positioned spray guns uniformly apply a two-component polyurethane based coating to the exposed surfaces of the cellular PVC clapboard. In an exemplary embodiment, five spray guns are utilized in the coating step. Furthermore, in an exemplary embodiment, the spray guns apply a coating having a thickness of about 4 millimeters to the cellular PVC clapboard.

The cellular PVC clapboard is then fed into a specially constructed drying tunnel. This drying tunnel will provide to each PVC clapboard about 10 minutes of flash-off time at ambient temperature, about 20 minutes of cure time at approximately 125 degrees Fahrenheit, and about 10 minutes of cool down to ambient temperature before handling. In an exemplary embodiment, the drying tunnel will process about six clapboards per minute.

The inventive process discussed above results in cellular PVC siding that can be installed according to historically accurate installation methods. That is, the cellular PVC siding formed from the novel process disclosed herein, exemplary embodiments of which are disclosed in FIGS. 4a-7b, can be installed according to installation methods accepted for the installation of cedar clapboard siding. This, then, eases installation and adds to the aesthetic appeal of synthetic siding materials. In addition to forming a uniquely configured cellular poly vinyl chloride clapboard for use in siding, the inventive process disclosed herein also provides for the precise profiling, cutting, and sawing of the cellular PVC sheets, boards, and clapboards to ensure proper fit and use in the field.

Although the principles of the present invention have been illustrated and explained in the context of certain specific embodiments, it will be appreciated by those of skill in the art that various modifications beyond those illustrated can be made to the disclosed embodiment without departing from the principles of the present invention.

What is claimed is:

1. A method for forming cellular poly vinyl chloride clapboard siding, comprising:
   profiling a cellular poly vinyl chloride board in a moulder to yield a two-up back-to-back configuration, wherein the profiling comprises:
   milling a first end and a second end of a cellular poly vinyl chloride board to form a profiled end, a radius, and a lower assembly groove on each of the first and second ends;
   milling a first and a second face of the cellular poly vinyl chloride board to qualify a thickness of the board; and
   milling a first saw groove and a first upper assembly groove on the first face and a second saw groove and a second upper assembly groove on the second face;
   sawing the profiled cellular poly vinyl chloride board at the first and second saw grooves to yield at least two cellular poly vinyl chloride clapboards; and
   coating the cellular poly vinyl chloride clapboards with a polyurethane based coating.

2. The method of claim 1, wherein the cellular poly vinyl chloride clapboard moves through the moulder at a speed of about 100 feet per minute.

3. The method of claim 2, wherein milling the first and second ends comprises applying a first cutter to the first end of the cellular poly vinyl chloride board and a second cutter to the second end of the cellular poly vinyl chloride board, and moving the cutters in relation to the board at a speed of about 8,000 revolutions per minute.

4. The method of claim 3, wherein milling the first and second ends further comprises qualifying a width of the cellular poly vinyl chloride board by the first and second cutters.

5. The method of claim 3, wherein each of the first and second lower assembly grooves are milled to have a throat opening of about 0.080 inch.

6. The method of claim 3, wherein milling the board to qualify the thickness of the board comprises applying a third cutter to the first face and a fourth cutter to the second face, and moving the third and fourth cutters in relation to the board at a speed of about 8,000 revolutions per minute.

7. The method of claim 6, wherein the board is milled such that the qualified thickness of the cellular poly vinyl chloride board is about 0.500 inch.

8. The method of claim 6, wherein milling the board to form the first and second saw grooves and the first and second upper assembly grooves comprises applying a first milling head to the first face and a second milling head to the second face, and moving the first and second milling heads in relation to the cellular poly vinyl chloride board at a speed of about 12,000 revolutions per minute.

9. The method of claim 8, wherein each of the first and second upper assembly grooves is milled to form a throat opening of about 0.080 inch.

10. The method of claim 1, wherein the profiling further comprises dissipating static that occurs during the milling steps.

11. The method of claim 10, wherein dissipating static comprises electrically connecting any component contacting the cellular poly vinyl chloride board in the milling operations to earth ground via a copper wire network.

12. The method of claim 1, wherein sawing comprises passing a band saw blade through the poly vinyl chloride board at the saw grooves wherein the poly vinyl chloride is fed to the band saw blade at a feed speed of about 60 meters per second.

13. The method of claim 1, wherein coating comprises uniformly spraying the polyurethane based coating on the cellular poly vinyl chloride clapboards.

14. The method of claim 1, wherein the cellular poly vinyl chloride clapboards are coated with about a 4 millimeter thick coating of the polyurethane based coating.

15. The method of claim 1, further comprising drying the coated cellular poly vinyl chloride clapboards, wherein drying comprises exposing the clapboards to about 10 minutes of flash-off time at ambient temperature, to about 20 minutes of cure time at approximately 125 degrees Fahrenheit, and to about 10 minutes of cool down.

16. The method of claim 1, further comprising punching a plurality of nailing slots into the poly vinyl chloride clapboards via a slotting machine, wherein the clapboards are fed into a slotting machine at a speed of about 200 feet per minute.

17. The method of claim 1, further comprising feeding the cellular poly vinyl chloride clapboards into a cleaning and de-ionizing module at a rate of about 200 feet per minute, wherein the module dissipates static charge built up on the cellular poly vinyl chloride clapboards, and brushes and vacuums the cellular poly vinyl chloride clapboards.

18. A method for forming cellular poly vinyl chloride clapboard siding comprising:
    feeding a cellular poly vinyl chloride sheet into a gang rip saw at a speed of about 20 feet per minute;
    cutting the cellular poly vinyl chloride sheet into a plurality of cellular poly vinyl chloride boards;
    conveying each of the cellular poly vinyl chloride boards into a moulder at a speed of about 100 feet per minute;
    milling each of the cellular poly vinyl chloride boards;
    conveying each of the cellular poly vinyl chloride boards to a band type sawing machine at a speed of about 100 feet per minute;
    parting each cellular poly vinyl chloride board with a band type sawing machine to form individual cellular poly vinyl chloride clapboards;
    feeding the cellular poly vinyl chloride clapboards to a paint application booth at a speed of about 200 feet per minute;
    coating the cellular poly vinyl chloride clapboards with a polyurethane based coating;
    drying the coated cellular poly vinyl chloride clapboards, wherein drying comprises exposing the coated cellular poly vinyl chloride clapboards to about 10 minutes of flash-off time at ambient temperature, to about 20 minutes of cure time at approximately 125 degrees Fahrenheit, and to about 10 minutes of cool down.

19. The method of claim 18, wherein milling comprises forming a two-up back-to-back cellular poly vinyl chloride board configuration, and wherein the milling creates a first lower assembly groove on a first face of the cellular poly vinyl chloride board, a second lower assembly groove on a second face of the cellular poly vinyl chloride board, a first upper assembly groove on the first face of the cellular poly vinyl chloride board, and a second upper assembly groove on the second face of the cellular poly vinyl chloride board, wherein the first and second lower assembly grooves and the first and second upper assembly grooves all comprise a throat opening of about 0.080 inch.

* * * * *